(12) United States Patent
Barta et al.

(10) Patent No.: US 8,989,757 B2
(45) Date of Patent: Mar. 24, 2015

(54) METHOD FOR ENERGY CONTROL IN A CELLULAR RADIO SYSTEM

(75) Inventors: József Barta, Budapest (HU); András Veres, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/579,129

(22) PCT Filed: Feb. 16, 2010

(86) PCT No.: PCT/SE2010/050174
§ 371 (c)(1),
(2), (4) Date: Aug. 15, 2012

(87) PCT Pub. No.: WO2011/102759
PCT Pub. Date: Aug. 25, 2011

(65) Prior Publication Data
US 2012/0329471 A1    Dec. 27, 2012

(51) Int. Cl.
*H04W 72/00*    (2009.01)
*H04W 52/34*    (2009.01)
(Continued)

(52) U.S. Cl.
CPC ............ *H04W 52/343* (2013.01); *H04W 24/02* (2013.01); *H04W 24/10* (2013.01); *H04W 28/08* (2013.01); *H04W 52/0206* (2013.01); *Y02B 60/50* (2013.01)
USPC .......... 455/452.1; 455/574; 455/453; 455/522

(58) Field of Classification Search
USPC ................ 455/452.1, 453, 522, 574
See application file for complete search history.

(56) References Cited

U.S. PATENT DOCUMENTS 6,584,330 B1    6/2003    Ruuska
6,729,929 B1 *  5/2004    Sayers et al. ................. 455/446
(Continued)

FOREIGN PATENT DOCUMENTS

CN    1520648 A    8/2004
CN    1933658 A    3/2007
(Continued)

OTHER PUBLICATIONS

Feng et al. "Self-Organizing Networks (SON) in 3GPP Long Term Evolution." Nomor Research GmbH, May 20, 2008, pp. 1-15, Munich, Germany.
(Continued)

*Primary Examiner* — Kashif Siddiqui
*Assistant Examiner* — Mong-Thuy Tran
(74) *Attorney, Agent, or Firm* — Coats & Bennett, P.L.L.C.

(57) ABSTRACT

Methods and devices enabling improved switch-on procedures during the reactivation of base stations already switched off to save power are provided. In accordance with one embodiment a method of activating a de-activated cell in a cellular radio system is provided. First measurements are collected from a number of user equipments connected to the cellular radio system. Based on the collected measurements a model for mapping a cell, the best cell, providing the least power increase in the cellular radio system when activated is constructed. When the traffic demand of the cellular radio system cannot be served using already activated cells it is determined to activate the cell that is mapped as the best cell to be activated. Hereby, the cells of a cellular radio system can be managed to maximally utilize the energy used in the system.

10 Claims, 5 Drawing Sheets

(51) Int. Cl.
  *H04W 24/02* (2009.01)
  *H04W 52/02* (2009.01)
  *H04W 24/10* (2009.01)
  *H04W 28/08* (2009.01)

(56) References Cited

U.S. PATENT DOCUMENTS

| | | | |
|---|---|---|---|
| 8,488,500 B2 * | 7/2013 | Mukherjee et al. | 370/311 |
| 2004/0198408 A1 * | 10/2004 | Dillon et al. | 455/522 |
| 2006/0258343 A1 * | 11/2006 | Schotten | 455/418 |
| 2009/0239569 A1 * | 9/2009 | Dottling et al. | 455/522 |
| 2009/0279466 A1 | 11/2009 | Ji et al. | |
| 2010/0002610 A1 * | 1/2010 | Bowser et al. | 370/311 |
| 2010/0056184 A1 * | 3/2010 | Vakil et al. | 455/456.5 |
| 2010/0105406 A1 * | 4/2010 | Luo et al. | 455/452.2 |
| 2010/0240367 A1 * | 9/2010 | Lee et al. | 455/435.2 |
| 2010/0279638 A1 * | 11/2010 | Lindoff | 455/226.1 |
| 2010/0311349 A1 * | 12/2010 | Koo et al. | 455/67.11 |

FOREIGN PATENT DOCUMENTS

| | | | | |
|---|---|---|---|---|
| EP | 1924109 A1 | 5/2008 | | |
| EP | 2056628 A1 | 5/2009 | | |
| EP | 2141947 A1 | 1/2010 | | |
| GB | 2316578 | * 8/1996 | | H04Q 7/36 |
| GB | 2377855 A | 1/2003 | | |
| WO | 02091621 A1 | 11/2002 | | |

OTHER PUBLICATIONS

Zhou et al. "Green Mobile Access Network with Dynamic Base Station Energy Saving." Mobile Com '09, Sep. 20-25, 2009, Bejing, China.

3rd Generation Partnership Project. "Discussion on Gradually Cell Switch off//on." 3GPP TSG-RAN WG3 #65bis, R3-092787, XP050392286, F-06921, Miyazaki, Japan, Oct. 12-15, 2009.

3rd Generation Partnership Project. "LTE energy saving solution proposal to cell switch off/on." 3GPP TSG-RAN WG3 #66bis, R3-100163, Valencia, Spain, Jan. 18-22, 2010.

European Telecommunications Standatds Institute, "Environmental Engineering (EE) Energy Efficiency of Wireless Access Network Equipment", Technical Specification, ETSI TS 102706, V1.1.1, Aug. 1, 2008, pp. 1-39, ETSI, France.

* cited by examiner

METHOD FOR ENERGY CONTROL IN A CELLULAR RADIO SYSTEM

TECHNICAL FIELD

The present invention relates to a method and a device for controlling transmission power in cells of a cellular radio system.

BACKGROUND

Radio base station power consumption is an important part of the total cost of a radio network. When there is no traffic in an area and the coverage may be served by a few other cells, e.g. umbrella cells, it may be efficient to switch some cells off or let them go into an energy saving mode.

Similarly, the energy consumption of radio networks can also be reduced if parts of, or a complete radio network (or RAT: Radio Access Technology) is switched-off in a multi-RAT environment, where multiple radio networks are covering the same area providing access via different radio network access technologies.

However, when saving power it may happen that the traffic situation suddenly changes, and that the cells/RAT in power saving mode needs to be activated to pose with the new traffic situation in the radio network. A problem when re-activating cells that are in an energy saving mode is that it is not known whether an additional demand resulting from the change in traffic can actually be served by reactivation of a particular base station. For example consider the situation where a radio base station is in an energy saving mode and that a sudden increase in traffic load is detected in the radio system. Assume further that the radio base station is not close to where the actual increase in traffic load has taken place. In this case it makes little sense to reactivate the radio base station, because the additional resource provided by reactivating the radio base station will do little good in helping to meet the demand for additional capacity. Hence, in this case the switching on of the radio base station is unnecessary.

Provided that the location of the potentially best cell to switch-on is known, another problem is to estimate is how efficient from energy consumption point of view it is to switch-on a radio base station. It may be that it requires less energy to serve the demand with the already active parts of the network.

As a result of the above, i.e. the problems of efficiently enabling power saving in cellular radio networks, typically, existing cellular radio networks generally do not reduce energy consumption of the network by switching on and off base stations. There are some special cases when the network management system of existing cellular radio networks switch on and off complete parts of the network, e.g. in shopping areas during night hours, but these scenarios are based on predefined time periods and independent of the existence and the location of actual traffic demands.

Hence, there exist a need for a method and a system that address the above and provides for improved energy savings in cellular radio systems.

SUMMARY

It is an object of the present invention to overcome or at least reduce some of the problems associated with energy savings in cellular radio networks as described above.

This object and others are obtained by the method and system as set out in the appended claims. Thus, in accordance with the invention methods and devices enabling improved switch-on procedures during the reactivation of base stations already switched off to save power are provided.

In accordance with one embodiment a method of activating a de-activated cell in a cellular radio system is provided. First measurements are collected from a number of user equipments connected to the cellular radio system. Based on the collected measurements a model for mapping a cell, the best cell, providing the least power increase in the cellular radio system when activated is constructed. When the traffic demand of the cellular radio system cannot be served using already activated cells it is determined to activate the cell that is mapped as the best cell to be activated. Hereby, the cells of a cellular radio system can be managed to maximally utilize the energy used in the system.

In accordance with one embodiment the measurements include one or many of a received signal power or a timing advance.

In accordance with one embodiment the measurements include one or many of an inter radio access technology measurement or positioning measurement.

In accordance with one embodiment the construction of a model for mapping a best cell to be activated based on the collected measurements is automatically performed using machine learning.

In accordance with one embodiment additional measurements are ordered to be performed by one or many user equipments.

In accordance with one embodiment measured power consumptions of base stations at given loads are collected and stored.

In accordance with one embodiment the measured power consumptions of base stations at given loads is used as input data when determining to activate the cell that is mapped as the best cell to be activated.

In accordance with one embodiment minimal network level energy consumption is achieved by localizing the best cell to serve a demand, and by performing an energy efficiency comparison before the switch-on command to check if the reactivation of switch-off cell results in decreased overall energy consumption of the network.

In accordance with one embodiment a measurement entity that collects and processes measurements from user equipments during a learning phase establishes a model covering the geographic areas where cells may be switched off. The measurements can include one or many of signal power measurements and timing advance measurements including measurements from intra- and inter-RAT, as well as optionally from positioning data from a positioning system such as Global Positioning System (GPS) data, In accordance with one embodiment a best cell estimation model decides the optimal choice of cells to be switched on based on partially available measurement during the deactivation time of some cells.

In accordance with one embodiment a decision and reactivation function controls the reactivation of cells.

The invention also extends to a device for performing the control method as described above.

BRIEF DESCRIPTION OF THE DRAWINGS

The present invention will now be described in more detail by way of non-limiting examples and with reference to the accompanying drawings, in which.

DETAILED DESCRIPTION

In accordance with the present invention measurements from terminals (UEs) are used to determine the need for switching on transmission from a radio base station. Based on the measurements, a "Best Cell Estimation model" can be formed containing a mapping between measurement vectors and best cell selection. The model can advantageously be built using machine learning methods.

When a cell (cells or all cells of a site or base station) is switched off for power conservation reasons, the system continues collecting measurements, but now measurements from the switched-off cell are missing. The "Best Cell Estimation model" estimates whether the switched-off cell is likely the best cell given a certain combination of measurements from the available neighboring cells.

If several or many UEs are actually located in an area where the switched-off cell would be the best cell as determined by the mapping between measurements and a best cell selection, and/or other criteria are also met, e.g. the neighbor cells are congested, the cell switched-off due to energy efficiency reasons is switched on (or activated). For example a cell/site it Discontinuous transmission (DTX) mode can be switched to a transmission (TX) mode based on these criteria.

When the potentially best cell is located, the final decision to switch on the cell is based on estimation of the energy efficiency comparing the network's energy consumption with the planned activated cell and the case when the traffic demand is served by the already active parts of the mobile network.

The method of estimating the location of a UE connected to a cell switched off due to energy efficiency reasons can also be used cover multi-RAT scenarios as well requiring multi-RAT measurements.

Below some detailed exemplary embodiment are described to further illustrate the invention. When a cell (cells or all cells of a site or base station) is switched off due to energy efficiency reasons, all traffic is handled by neighboring cells and the switched off cell does not handle any users. If there is an increase in traffic demand that has to be served, the cell may have to be reactivated on-demand. In accordance with one embodiment the method for determining to switch on a cell can be described as three phases.

Learning phase,
Localization phase, and
Decision phase.

Learning Phase

The Learning phase is a procedure running during the normal operation of a cell (i.e. the cell is not in energy consumption operation) and can comprise the following steps:

Measurement collection, and
Best Cell Estimation.

Measurement Collection

Figure 1:
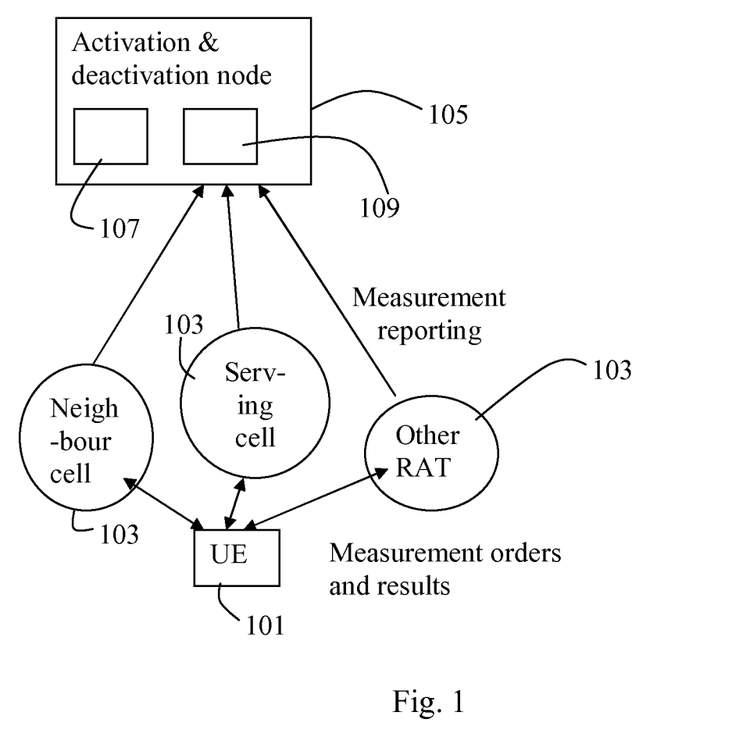
FIG. 1 is a view illustrating a system used for determining activation of a cell.

In a measurement collection step a network management node configured to collect UE measurements to support handover decisions for several neighbor cells. The measurements can typically include received power, timing advance or other measurement vectors available in a cellular radio system, e.g. to support handover decisions. A network management node is then configured to use the collected measurements to automatically learn what values a combinations of measurement vectors have when an actual cell is chosen as best cell to serve the user and in what combinations the best cell is not the actual cell. An alternate or additional data source can be the GPS location information reported by the UEs or any other location information available for the cellular radio system network. An exemplary measurement collection set up is depicted in FIG. 1. In FIG. 1 a UE 101 is configured to generate measurements. The generated measurements are sent vi a suitable interface for example to a serving cell 103, a neighbour cell 103 or another Radio Access Technology 103 and reported back to a node 105 for activating and deactivating cells. The node 105 can be implemented in an existing node of the cellular radio system such as a network management node or be distributed over several nodes in communication with each other.

Existing cellular radio systems typically enable collecting measurements on demand via some management settings. In accordance with one embodiment the system/entity controlling the measurement phase can be configured to order additional measurements for areas and UEs. An example of when additional measurements can be ordered is when there is not sufficient data available for the node 105 to make a well based decision if to activate/deactivate a cell or not. Whenever possible, measurements from overlapping other radio technologies are also collected. Thus the base station reactivation procedure implemented by the node 105 will have both sufficient amounts of data available for an efficient estimate of which cells to switch on.

In accordance with one embodiment measurements from many, typically hundreds or more, UEs are collected, stored and periodically updated in a database by an entity entrusted with this task. In accordance with one embodiment the node 105 is configured to base its decision on many measurements collected both when the actual cell, i.e. the cell determined to be activated or deactivated, is the serving cell and also when the cell is not the serving cell (neighboring cell). The processing steps performed by the node 105 can for example be executed by a micro processor 107 executing suitable software causing a computer to execute the procedural steps as described herein and which can be stored on a memory 109.

Figure 2:
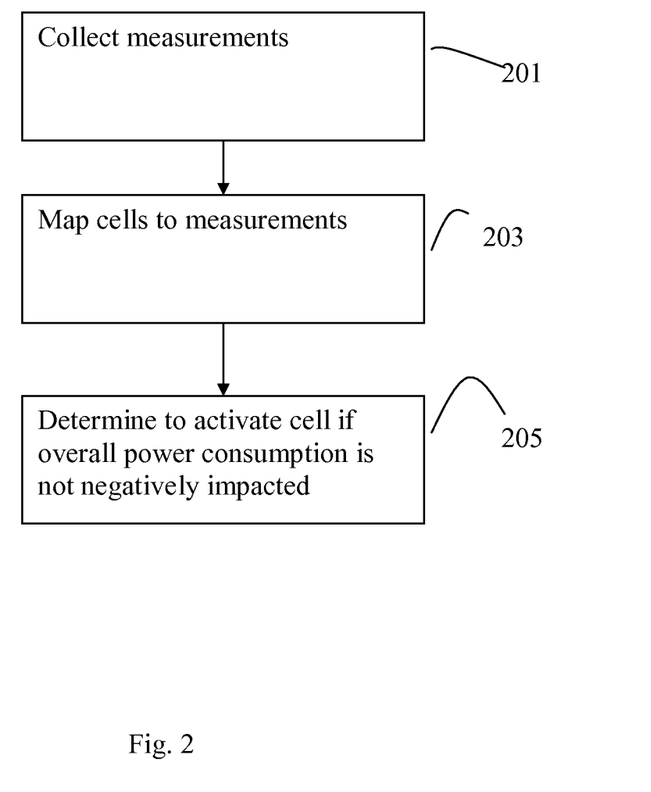
FIG. 2 is a flowchart illustrating some procedural steps performed when determining to activate a cell in a cellular radio system.

In FIG. 2 a flowchart illustrating some procedural steps performed when activating a deactivated a cell is shown. The procedural steps can for example be implemented as computer program instructions and stored in a memory of the node 105. The node 105 will then be enabled to perform the steps by executing the program stored on the memory.

First, in a step 201 measurements are collected from a number of user equipments connected to the cellular radio system. Thereupon, in a step 202 a model is constructed for mapping a best cell to be activated based on the collected measurements such that the total energy consumption in the system is minimized. Finally, in a step 205 a cell that is mapped as the best cell to be activated is activated if one of the two following conditions is met:

(i) if the traffic demand of the cellular radio system cannot be served using already activated cells, or (ii) it is determined (estimated) that the activation of the switched off cell is beneficial concerning the overall energy consumption of the cellular radio system; otherwise the cell is not activated.

As described above the UE can report many different measurements. For example measurements can be reported by a UE on signal strengths of surrounding cells. This type of input can provide information about the neighboring cells when the best cell is currently switched on.

Examples are presented in Table 1 to Table 3 on how received pilot power, timing advance and potentially GPS coordinates can be stored during the Learning phase. Note, these are examples and it is not necessary to fill all possible information, only when it is available from the actual measurement situation.

TABLE 1

Input table for machine learning including power measurement:

| Independent variables | | | |
|---|---|---|---|
| UE received pilot power from neighbor Cell A | UE received pilot power from neighbor Cell B | UE received pilot power from neighbor Cell C | Dependent variable Best cell |
| Xx | Xx | Xx | A |
| Yy | Yy | Yy | B |
| | | | ... |

TABLE 2

Input table for machine learning including timing advance measurement

| Independent variables | | | |
|---|---|---|---|
| UE timing advance for Cell A | UE timing advance for Cell B | UE timing advance for Cell C | Dependent variable Best cell |
| Xx | Xx | Xx | A |
| Yy | Yy | Yy | B |
| | | | ... |

TABLE 3

Input table for machine learning including GPS location

| Independent variables GPS location | Dependent variable Best cell |
|---|---|
| Xx | A |
| Yy | B |
| | ... |

There can be situations when there is absolutely no information available from any other cells than the own cell (e.g. in isolated microcells). In this case the measurement collection can be extended to collect cell information from other radio access technologies (RATs) available in the area of the cell. This can for example be executed by forcing an inter-RAT measurement.

Also, historical data of the cell can also be included if no other source of information is available. When historical data is used it is in accordance with one embodiment possible to use the last known possible location to be still valid. Also the weight of historical data can be set to depend on how old the historical data is. Older data can be given less weight than newer historical data.

In addition to the above described measurement collection, the base stations can be configured to support measuring of the historical Energy Profile (EP). The Energy Profile measures the power consumption of the base station at given loads. The load may be one dimensional, or multidimensional, e.g., number of active users and traffic load. In the below an exemplary two-dimensional history is used. The history EP can be collected and maintained by the base stations to assist in the decision phase. A practical representation of the EP is a tabular format, where the EP is described as the power in Watt per certain ranges of load values, e.g. EP(number of users=4, load=60 Mbps)=800 Watt.

Best Cell Estimation Model

In accordance with one embodiment a machine learning method is used to build a decision rule set based on the reported data. The model is here called Best Cell Estimation Model, because it will estimate the most likely best cell selection to be activated based on available measurements.

The method used to determine the Best Cell Estimation Model can be any generic machine learning (ML) algorithms adapted to provide model building for this type of model. The input to the ML algorithm, such as all measurements from the neighbors can be treated as independent variables and the identity of the best cell is treated as the dependent variable.

Figure 3:
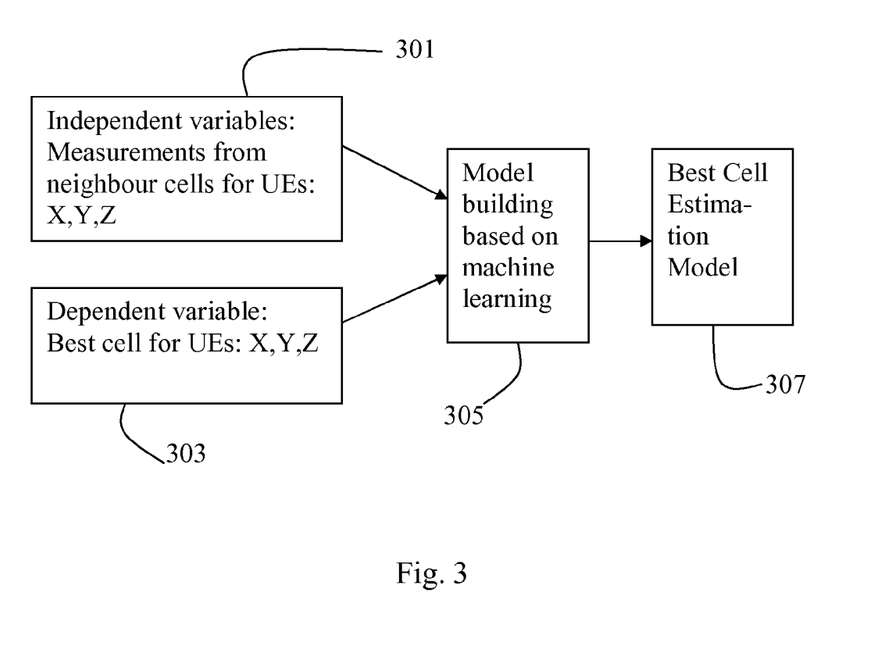
FIG. 3 depicts an exemplary structure of an estimation model.

As an example, the structure of the estimation model is shown in FIG. 3. As depicted in FIG. 3 independent variables from UE measurements 301 and dependent variables 303 indicating the best cell for a UE are fed to a block 305. Block 305 comprises model building based on machine learning as described above. The output 307 from the block 305 is a Best Cell Estimation Model.

Figure 4:
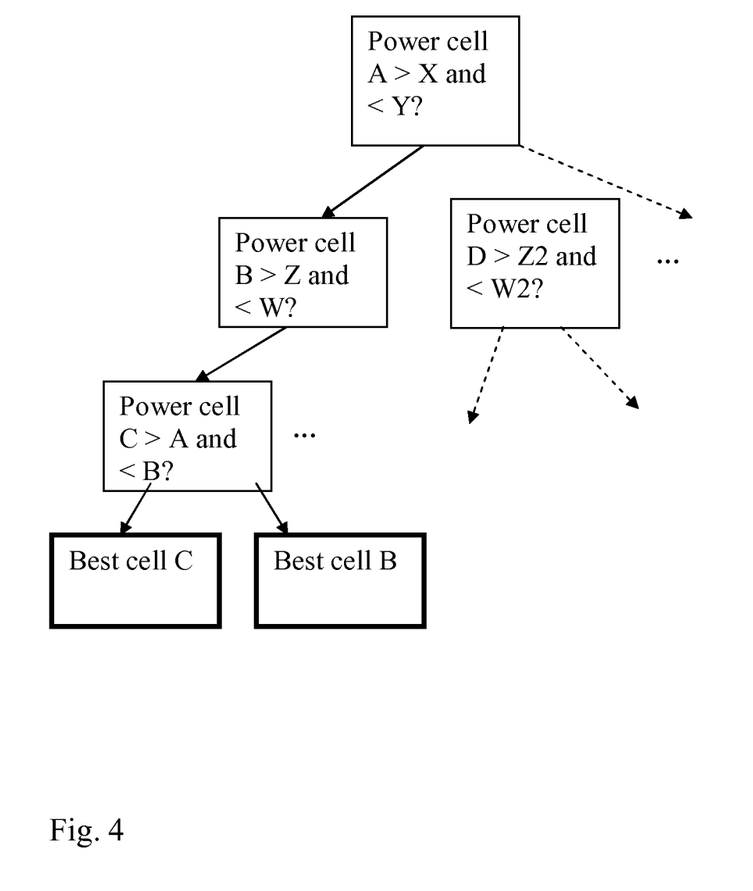
FIG. 4 depicts an exemplary Best Cell Estimation model.

FIG. 4 depicts an example of the Best Cell Estimation model that can be used for determining the best cell for a particular scenario. The model is automatically constructed based on the independent variables and dependent variables used as described above. The output is a determination of the cell that if active would result in the radio system overall lowest power consumption based on the model used when fed with the UE measurements and the best cells for the UEs.

Multi-RAT Scenario

If the area is covered by more than one radio access technology or other layers of the same technology, e.g. another carrier in High Speed Packet Access (HSPA) networks, the measurement collection and the Best Cell Estimation model can be extended to include measurements from the neighboring cells of more than one or all access technologies covering the area.

The information from other RATs can be used for the measurement collection only to provide additional information (see discussion earlier), or the activation of base stations involve cells from different RATs. In the latter case, thresholds can be introduced in the cells to initiate activation of cells in the other RATs similarly as available in existing inter-system handover procedures.

Localization Phase

When one or several cells or sites have been switched off to improve the energy efficiency of a mobile network there can be a need to reactivate one or more of the deactivated cells/sites. In order to reactive the cell or cells from the energy conversion mode, the activation node can be configured to collect measurements from UEs, which typically can be performed similarly to the one in the learning phase, but now without the information on the switched off cell (when active called the best cell).

The activation node can then invoke the Best Cell Estimation model to get an estimate of whether the switched-off cell would be the best to serve a user or not.

The machine learning method can then learn the likely best cell if only the other data are available.

Figure 5:
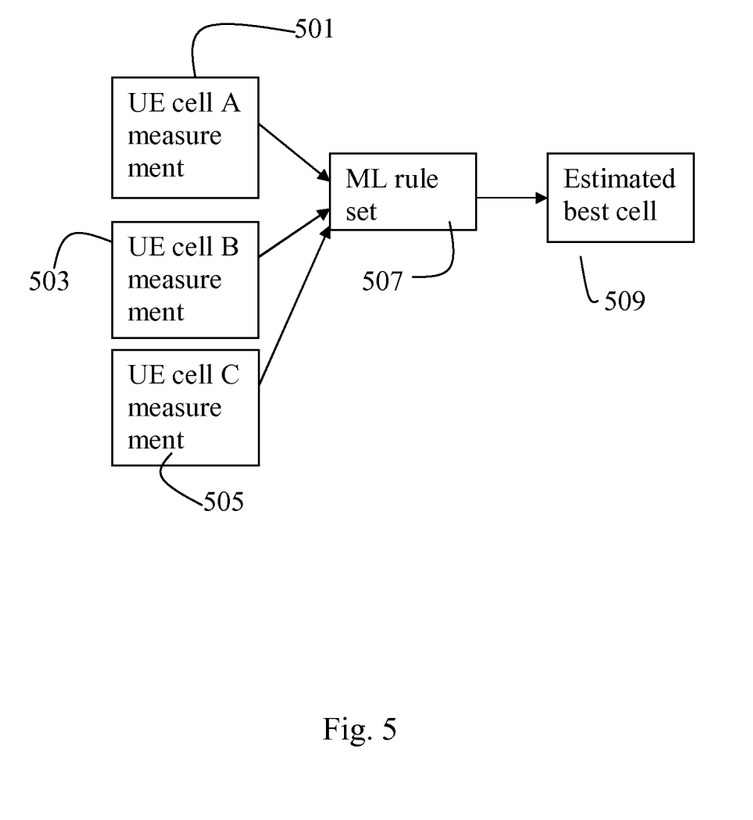
FIG. 5 depicts processing blocks used in a machine learning process.

The structure of the localization phase is shown in FIG. 5. In FIG. 5 processing blocks in a machine learning process used for mapping between a set of measurement vectors and the estimated best cell candidate are shown. Thus, measurements are received from a number of cells (A, B, C, ... ) here represented by the blocks 501, 503, and 505. The received measurements are processed by a machine learning (ML) process in a block 507. The output from the block 507 is a mapping between a set of measurement vectors and the estimated best cell candidate as represented by block 509.

The best cell estimation can then be performed for all UEs reporting measurements. It can also be calculated how many of them would be best served by the switched-off cell. The estimation can also include cells from other RATs covering the investigated area if the required information is available from the available radio access technologies.

Decision Phase

In Decision phase, the management entity decides whether:

The load in one or more cells is too high and a switched off cell must be started There are users that are best served by a number of switched-off cells (localization), After the localization, an energy efficiency comparison is performed. This part of the decision phase ensures that the switch-on procedure is made only if it provides enough offload and a minimum increase of energy consumption.

During the energy efficiency comparison, case estimations can be made based on existing database information on the expected power requirements to serve the users by the already active cells and by the cells targeted for re-activation. The results of the estimation, together with the known fixed and load dependent energy consumption characteristics of the network elements, ensures that that cells are re-activated only if the overall energy consumption is decreased. In one embodiment the estimation is based on the comparison of the Energy Profiles (EP) of the base stations. The power gain from switching on the cell is a calculation:

$$PG = EP_{serving}(\text{current\_users}, \text{current\_load}) - (EP_{candidate}(\text{delta\_users}, \text{delta\_load}) + EP_{serving}(\text{current\_users} - \text{delta\_users}, \text{current\_load} - \text{delta\_load}))$$

The delta users define the number of users that the change would impact and delta load is the amount of load to be transferred due the switch-on. As expected, if the candidate cell is a microcell, the Energy Profile has typically significantly lower values due to its small coverage, etc. As a consequence, it is most likely that the Power Gain (PG) will be positive for a wide range of load values, so the switching on will almost always be worthwhile. In other situations the switching decision may or may not find the switch-on to be worthwhile.

When a decision is made to activate a cell, the cell may go active and invoke the learning phase again.

The decision phase described above can be simplified to ignore the energy efficiency comparison in congested situations (e.g. above a certain load threshold) when the demand cannot be served by the active part of the network.

The decision phase in a multi-RAT scenario can be capable of handling measurements from multiple radio technologies making decisions to activate switched-off cells in other radio technology cells as well if that provides more energy efficient solutions.

The methods and devices for activating cells/sites as described herein provides numerous advantages over existing cellular radio system. For example, the energy efficiency can be optimized in a mobile network by controlling the reactivation of cells in an optimal way. The solution ensures minimal network level energy consumption by localizing the best cell to serve the demand, and by performing an energy efficiency comparison before the switch-on command to check if the reactivation of switch-off cell results in decreased overall energy consumption of the network.

The invention claimed is:

1. A method of activating a de-activated cell in a cellular radio system, the method comprising:
    collecting measurements from a number of user equipment connected to the cellular radio system;
    constructing a model for mapping a first cell generating a least power increase in the cellular radio system to be activated based on the collected measurements;
    determining to activate the cell mapped as the first cell to be activated when traffic demand of the cellular radio system cannot be served using already activated cells, wherein activation of the cell mapped as the first cell decreases the overall energy consumption of the cellular radio system; and
    collecting and storing measured power consumptions of base stations at given loads;
    wherein the measured power consumptions of the base stations at the given loads are used as input data when determining to activate the cell mapped as the first cell to be activated.

2. The method of claim 1 wherein the collected measurements comprise one or more received signal powers or one or more timing advances.

3. The method of claim 1 wherein the collected measurements comprise one or more inter radio access technology measurements or one or more positioning measurements.

4. The method of claim 1 wherein constructing the model comprises automatically constructing the model for mapping the first cell to be activated based on the collected measurements using machine learning.

5. The method of claim 1 further comprising ordering additional measurements to be performed by one or many user equipment.

6. A network device for activating a de-activated cell in a cellular radio system, the network device comprising a processor configured to:
    collect measurements from a number of user equipment connected to the cellular radio system;
    construct a model for mapping a first cell generating a least power increase in the cellular radio system to be activated based on the collected measurements;
    determine to activate the cell mapped as the first cell to be activated when traffic demand of the cellular radio system cannot be served using already activated cells, wherein activation of the cell mapped as the first cell decreases the overall energy consumption of the cellular radio system; and
    collect and store measured power consumptions of base stations at given loads;
    wherein the measured power consumptions of base stations at given loads are used as input data when determining to activate the cell that is mapped as the first cell to be activated.

7. The device of claim 6 wherein the measurements comprise one or more received signal powers or one or more timing advances.

8. The device of claim 6 wherein the measurements comprise one or more inter radio access technology measurements or one or more positioning measurements.

9. The device of claim 6 wherein the processor is further configured to automatically perform the construction of the model for mapping the first cell to be activated based on the collected measurements using machine learning.

10. The device of claim 6 wherein the processor is further configured to order additional measurements to be performed by one or many user equipment.

* * * * *